United States Patent
Wang

(10) Patent No.: US 7,800,484 B2
(45) Date of Patent: Sep. 21, 2010

(54) CAR SAFETY DEVICE

(76) Inventor: James Wang, 1207 Columbus St., Bakersfield, CA (US) 93305

( * ) Notice: Subject to any disclaimer, the term of this patent is extended or adjusted under 35 U.S.C. 154(b) by 291 days.

(21) Appl. No.: 12/221,974

(22) Filed: Aug. 9, 2008

(65) Prior Publication Data
US 2010/0033317 A1 Feb. 11, 2010

(51) Int. Cl.
*B60R 25/10* (2006.01)
(52) U.S. Cl. .................. 340/426.22; 340/438; 340/468; 340/425.5; 340/457; 340/901; 340/933
(58) Field of Classification Search ............ 340/426.22, 340/468, 425.5, 457, 901, 933, 438
See application file for complete search history.

(56) References Cited

U.S. PATENT DOCUMENTS 6,437,690 B1 * 8/2002 Okezie ..................... 340/505

2002/0036565 A1 * 3/2002 Monroe ................... 340/425.5
2005/0283388 A1 * 12/2005 Eberwine et al. ............. 705/4

* cited by examiner

*Primary Examiner*—Tai T Nguyen
(74) *Attorney, Agent, or Firm*—Clement Cheng

(57) ABSTRACT

A vehicle safety device has a cabin unit which includes a cabin unit housing holding a keypad, a speaker, a cpu, and a transmitter. The speaker provides an audio signal when a vehicle speed input reaches a preset low-speed, a preset medium speed, and at a preset high speed. A rear unit receives signals from the cabin unit, and the rear unit has a housing holding a seat belt light. The seat belt light is interconnected to a vehicle seat belt sensor. A registration light and a proof of insurance light is also mounted on the rear unit. The rear unit is mounted on the vehicle exterior, preferably on the rear license plate frame.

17 Claims, 1 Drawing Sheet

CAR SAFETY DEVICE

FIELD OF INVENTION

This invention relates to car safety devices.

DISCUSSION OF RELATED ART

Automotive safety is everyone's most important concern while driving. Because of the many vehicles on the road together, it is difficult to ensure a safe driving experience. Thus, a wide variety of inventions have attempted to make our roads safer for everyone. Also, given the potential for death or serious injury, policing of vehicles to ensure safe driving is expensive and sometimes inefficient. Therefore, a wide variety of inventions have also made it easier to police vehicles and promote compliance with the law.

For example, inventor Taylor in PCT international publication WO 01/98 794 A3 and its related patent, U.S. Pat. No. 6,265,989 also to Taylor both provide for a GPS speeding detector. GPS speeding detectors are wonderful because they have a GPS receiver that sends data to a processor and compares current speed with a database of speed limits for a particular geographical region. Unfortunately, making a database of speed limits for a particular geographical region is time-consuming, expensive and requires updating on a regular basis.

Gehlot in U.S. Pat. No. 6,163,277 goes even further and provides for wireless control of vehicles, analysis of driving patterns, automatic generation of speeding tickets, and analyzing speed limits. The difficulty in implementing the speed limit database in this case, would be compounded with the difficulty of managing wireless automatically controlled vehicles, not to mention the software and algorithms required for an analysis of driving patterns. The complexity of the solution would present its own inherent problems.

Adcox in U.S. Pat. No. 6,388,579 provides for a vehicle status and system for remotely updating and monitoring the status of the vehicle. Monitoring vehicles typically provides for safer driving, and having a vehicle identification interacting with an interrogation unit provides for further transmission of vehicle information between the vehicle and the owner.

Humphrey in U.S. Pat. No. 6,462,675 provides for a global positioning system that interfaces with a speed limit associated with that position on a centralized database accessible via a wireless network. The driver could be alerted if the speed was exceeded. The onboard vehicle speed monitoring system provides for accessing a database on a remote server. This implementation is somewhat difficult because the remote server is presumably using IP protocol and thus difficult to implement in areas where a wireless network is unavailable.

SUMMARY OF THE INVENTION

A cabin unit has a housing with a processor and speaker. The housing unit is programmed to give a tone at a low speed, a middle speed and a high-speed. The low-speed is preferably set to 25 mph, the middle speed is preferably set to 45 mph and the high-speed is preferably set to 65 mph. The low-speed is preferably set to the local speed limit, the middle speed is preferably set to an arterial roadway speed limit and the high-speed is preferably set to the highway speed limit. The settings can be changed by the user. A rear unit, mounted on license plate frame, or comprising its own license plate frame has three signal lights, each indicating one of a seat belt compliance, insurance compliance and tax compliance. The light cooperates with an infrared light also mounted on the rear unit.

The rear unit preferably uses a red yellow-green multicolor LED in each of the three indicators so that each color indicates status of the seat belt, insurance and tax. The cabin unit and the rear unit are preferably wirelessly interconnected. When a user has proof of insurance payment, the user enters the code on a keypad located on the cabin unit. The code is received from the insurance company. The tax payment, or registration payment is similarly coded so that a user receives a code from the Department of Motor Vehicles which keeps the rear LED turned off. The infrared LED on the frame emits a compliance signal to verify that each of the visible lights are accurate and not tampered with.

The connection between the cabin unit and the rear unit can also be made by powerline data transfer. The data transfer on vehicle 12V while very noisy, could still be accomplished by a wide variety of presently commercially available means such as the Yamar® V DC-BUS power line semi conductor transceiver. Other multiplex powerline network solutions are currently being developed for faster data transfer. In the present invention, the data transfer need not be very quick, and can be on the order of magnitude of one transmission of data per day, or even as slow as one transmission per week. Therefore, even a slow data transfer rate as low as 1200 baud would be more than sufficient for the purposes of this invention. Alternatively, the connection between the cabin unit and rear unit could be both the powerline data transfer as well as the wireless transmitter.

The powerline data transfer preferably operates on the vehicle 12V electrical system. The cabin unit can be connected electrically to the electrical system by being built in to the vehicle dashboard, or by plugging into a power socket. The rear unit receives power from the 12V electrical system and also preferably attaches to the license plate frame via an attachment frame formed as a portion of the housing of the rear unit. The rear unit is mounted on the vehicle exterior, preferably on the rear license plate frame.

The seat belt light is connected to the vehicle seat belt sensor. When the seat belt sensor senses that a seat belt is engaged, the sensor additionally sends a signal to the cabin unit which sends a signal to the rear unit. The vehicle speed input can be generated from the OBD or from GPS data.

DETAILED DESCRIPTION OF THE PREFERRED EMBODIMENT

Figure 1:
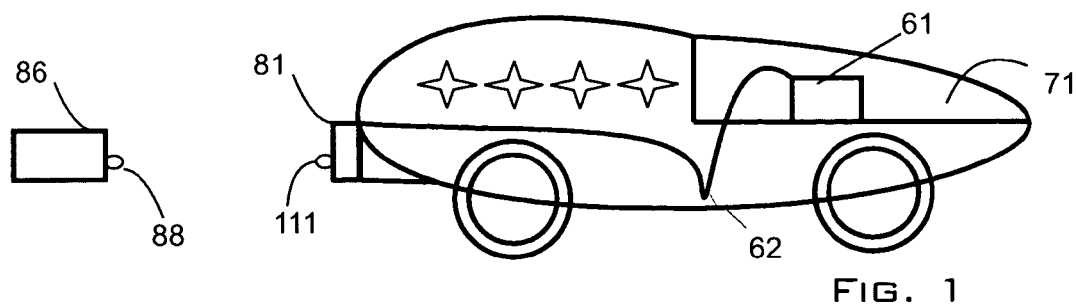
FIG. 1 is a diagram of the present invention.

The present invention FIG. 1 is mounted in an automobile. FIG. 1 shows an automobile driving toward the right side of the page. The front of the automobile has a cabin 71 for the passengers and for the cabin unit 61. The cabin unit 61 has a plurality of controls on a keypad 211. The cabin unit 61 can be connected to the rear unit 81 by a powerline data line which can also provide the 12V power for the cabin unit and the rear unit. The rear unit is currently mounted by the license plate frame. A rear unit may be sized so that it has similar sizing with the license plate mounting bolts on a typical automobile. The rear unit, mounted on license plate frame, or comprising its own license plate frame has three signal lights, each indicating one of a seat belt compliance, insurance compliance and tax compliance. The light cooperates with an infrared light also mounted on the rear unit.

Figure 2:
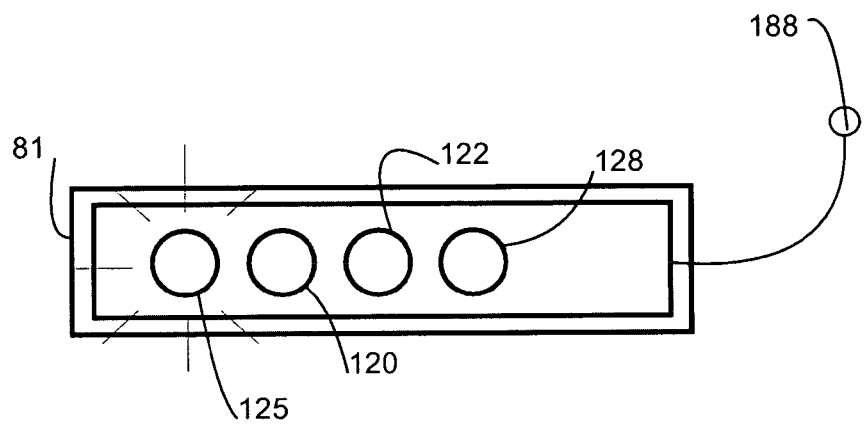
FIG. 2 is a diagram of the rear unit.

The rear unit as seen in FIG. 2 has a housing with a set of lights 111, namely a seat belt light 120, registration light 122, and an insurance light 128. The rear unit optionally has a wireless receiver for receiving a seat belt light signal, a registration light signal and an insurance light signal for activating the seat belt light, the registration light and the insurance light. Additionally, the rear unit has an infrared light 125 which emits a compliance signal as a check and verification for the proper operation of the other three lights. The rear unit infrared light 125 flashes in a sequence indicating compliance. The remote receiver 86 has an infrared receiver 88 receiving the pulses of the compliance indications from the rear unit infrared light 125.

Figure 3:
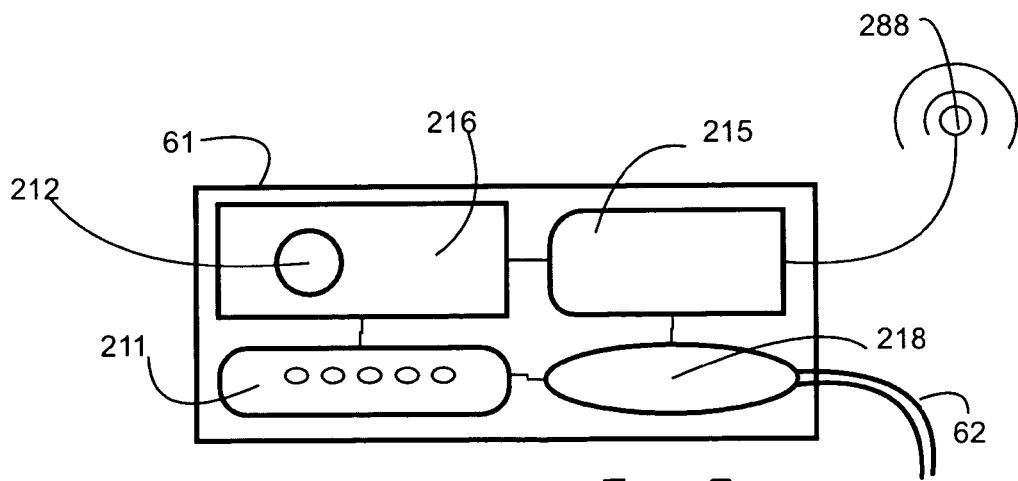
FIG. 3 is a diagram of the cabin unit.
The following call out list of elements is applied consistently across the drawings.
61 Cabin Unit
62 Powerline Data Line
71 Cabin
81 Rear Unit
86 Remote Unit
88 Remote Unit Receiver
111 Set Of Lights
125 Infrared Emitter Light
120 Seat Belt Light
122 Registration Light
128 Insurance Light
188 Rear Unit Wireless Transceiver/receiver
211 Keypad Input
212 Speaker
216 Processor Board 215 Wireless Transceiver/transmitter Controller
218 Powerline Transmitter/transceiver
288 Cabin Unit Wireless Transceiver/transmitter

A cabin unit 61 has a housing with a processor 216 and speaker 212. The processor 216 may be implemented as a series of interconnected elements on a circuit board to comprise a processor board. The processor 216 is programmed to give a tone from the speaker 212 at a low speed, a middle speed and a high-speed. The low-speed is preferably set to 25 mph, the middle speed is preferably set to 45 mph and the high-speed is preferably set to 65 mph. The low-speed tone can be set to operate at 30 mph, the middle speed tone set to operate at 50 mph and the high-speed tone set to operate at 75 mph. The low-speed is preferably set to the local speed limit, the middle speed is preferably set to an arterial roadway speed limit and the high-speed is preferably set to the highway speed limit. The settings can be changed by the user using the keypad 211 which has numerous pushbutton inputs. The pushbuttons shown in FIG. 3 could be organized in a straight line of five buttons, or the pushbuttons could be organized in a 10 key format if a larger interface is desired.

The rear unit preferably uses a red yellow-green multicolor LED in each of the three indicators so that each color indicates status of the seat belt, insurance and tax. The cabin unit and the rear unit are preferably wirelessly interconnected. When a user has proof of insurance payment, the user enters the code on a keypad located on the cabin unit. The code is received from the insurance company. The tax payment, or registration payment is similarly coded so that a user receives a code from the Department of Motor Vehicles which keeps the rear LED turned off. The infrared LED on the frame emits a compliance signal to verify that each of the visible lights are accurate and not tampered with. A unique code of the vehicle, such as the vehicle identification number could be used to perform a mathematical operation with an entry of code so that a random entry or entry related to a different vehicle would not operate to make any of the indicators operate in a compliance mode. In compliance mode, the status of the light for the registration or insurance could be on, off, or intermittent such as in the case of an encoded transmission of data.

The connection between the cabin unit and the rear unit can also be made by powerline data transfer. The data transfer on vehicle 12V while often sometimes noisy, could still be accomplished by a wide variety of presently commercially available means such as the Yamar® DC-BUS power line semi conductor transceiver. Other multiplex powerline network solutions are currently being developed for faster data transfer. In the present invention, the data transfer need not be very quick, and could possibly be on the order of magnitude of one transmission of data per day. Therefore, even a slow data transfer rate as low as 1200 baud would be more than sufficient for the purposes of this invention. Alternatively, the connection between the cabin unit and rear unit could be both the powerline data transfer as well as the wireless transmitter. The wireless transceivers could also be wireless transmitters or receivers with the cabin unit having a transmitter 288 and the rear unit having a receiver 188.

The powerline data transfer 62 preferably operates on the vehicle 12V electrical system. The cabin unit can be connected electrically to the electrical system by being built in to the vehicle dashboard, or by plugging into a power socket. The cabin unit powerline transceiver 218 gets power for powering the cabin unit, and the cabin unit powerline transceiver 218 also transmits signals to the rear unit. The powerline transceiver 218 could also be a powerline transmitter 218. The rear unit receives power from the 12V electrical system and also preferably attaches to the license plate frame via an attachment frame formed as a portion of the housing of the rear unit. The rear unit 81 is mounted on the vehicle exterior, preferably on the rear license plate frame.

In a wireless transmission scenario between the rear unit 81 and the cabin unit 61, a rear unit wireless transceiver 188 receives transmissions from the cabin unit 61. The cabin unit 61 has a wireless transceiver controller 215 which prepares a unique signal for the rear unit wireless transceiver 180. The unique signal generated by the wireless transceiver controller 215 is preferably a spread spectrum signal, but need not be. As long as the signal does not interfere with other rear unit modules of other vehicles, the wireless transceiver controller 215 is operating properly.

The seat belt light is connected to the vehicle seat belt sensor. When the seat belt sensor senses that a seat belt is engaged, the sensor additionally sends a signal to the cabin unit which sends a signal to the rear unit. The vehicle seat belt signal may be transmitted on the powerline 62 from the seat belt sensor or vehicle computer to the powerline transmitter or receiver 218. All of the elements within the cabin unit 61 housing is preferably made on a single board rather than in various modules as shown in the block diagram of FIG. 3 which is made as a block diagram for illustrative purposes.

The vehicle speed input can be generated from the OBD or from GPS data. A wide variety of commercially available means for generating a vehicle speed input is known in the prior art. The vehicle speed is input into the processor 216.

Thus, the present invention has the object to provide vehicle monitoring which preferably leads to driver compliance which preferably leads to safer vehicle operation. The present invention contemplates that other many changes and modifications may be made. Therefore, while the presently preferred form of the vehicle safety device have been shown and described, and several modifications discussed, persons skilled in this art will readily appreciate that various additional changes and modifications may be made without departing from the spirit of the invention, as defined and differentiated by the following claims. For example, operation of the transceiver units at a higher data rate transfer is obvious in light of the disclosure above.

The invention claimed is:
1. A vehicle safety device comprising:
 a. a cabin unit comprising:
  i. a cabin unit housing holding:
  ii. a keypad allowing user input, wherein the keypad comprises a plurality of buttons;
  iii. a speaker, wherein the speaker provides an audio signal when a vehicle speed input reaches a preset low-speed, a preset medium speed, and at a preset high speed;
  iv. a cpu receiving user input from the keypad, and
  v. a transmitter transmitting signals; and
 b. a rear unit receiving signals from the cabin unit, wherein the rear unit has a housing holding:
  i. a seat belt light, wherein the seat belt light is interconnected to a vehicle seat belt sensor so that the seat belt light is activated to indicate seat belt status;
  ii. a registration light which is activated to indicate a registration status; and
  iii. a proof of insurance light which is activated to indicate proof of insurance status.

2. The vehicle safety device of claim 1 further comprising a license plate attachment frame formed on the rear unit.

3. The vehicle safety device of claim 1 further comprising a remote unit having an infrared receiver, and an infrared light mounted on the rear unit, wherein the infrared light flashes in a pattern that the infrared receiver receives and decodes, wherein the infrared receiver produces an output on the remote unit.

4. The vehicle safety device of claim 1 further comprising a registration light code that a user inputs into the keypad of the cabin unit to activate the registration light in a compliance mode.

5. The vehicle safety device of claim 1 further comprising an insurance light code that a user inputs into the keypad of the cabin unit to activate the insurance status in a compliance mode.

6. The vehicle safety device of claim 1 further comprising a registration light code that a user inputs into the keypad of the cabin unit to activate the registration light in a compliance mode; further comprising an insurance light code that a user inputs into the keypad of the cabin unit to activate the insurance status in a compliance mode.

7. The vehicle safety device of claim 6 further comprising a license plate attachment frame formed on the rear unit.

8. The vehicle safety device of claim 7 further comprising a remote unit having an infrared receiver, and an infrared light mounted on the rear unit, wherein the infrared light flashes in a pattern that the infrared receiver receives and decodes, wherein the infrared receiver produces an output on the remote unit.

9. The vehicle safety device of claim 6 further comprising a remote unit having an infrared receiver, and an infrared light mounted on the rear unit, wherein the infrared light flashes in a pattern that the infrared receiver receives and decodes, wherein the infrared receiver produces an output on the remote unit.

10. The vehicle safety device of claim 6 wherein the preset low-speed tone is 30 mph, the preset medium speed tone is 50 mph, and the preset high speed tone is 75 mph.

11. The vehicle safety device of claim 1 wherein the cabin unit transmitter transmits signals wirelessly to the rear unit.

12. The vehicle safety device of claim 1 wherein the cabin unit transmitter transmits signals by vehicle low-voltage power line to the rear unit.

13. A vehicle safety device comprising:
 a. a cabin unit comprising:
  i. a cabin unit housing holding:
  ii. a keypad allowing user input, wherein the keypad comprises a plurality of buttons;
  iii. a speaker, wherein the speaker provides an audio signal when a vehicle speed input reaches a preset low-speed, a preset medium speed, and at a preset high speed;
  iv. a cpu receiving user input from the keypad, and
  v. a transmitter transmitting signals; and
 b. a rear unit receiving signals from the cabin unit, wherein the rear unit has a housing holding:
  i. a registration light which is activated to indicate a registration status; and
  ii. a proof of insurance light which is activated to indicate proof of insurance status.

14. The vehicle safety device of claim 13 further comprising a registration light code that a user inputs into the keypad of the cabin unit to activate the registration light in a compliance mode; further comprising an insurance light code that a user inputs into the keypad of the cabin unit to activate the insurance status in a compliance mode.

15. The vehicle safety device of claim 14 further comprising a license plate attachment frame formed on the rear unit.

16. The vehicle safety device of claim 15 further comprising a remote unit having an infrared receiver, and an infrared light mounted on the rear unit, wherein the infrared light flashes in a pattern that the infrared receiver receives and decodes, wherein the infrared receiver produces an output on the remote unit.

17. The vehicle safety device of claim 14 further comprising a remote unit having an infrared receiver, and an infrared light mounted on the rear unit, wherein the infrared light flashes in a pattern that the infrared receiver receives and decodes, wherein the infrared receiver produces an output on the remote unit.

* * * * *